United States Patent
Duboué et al.

(10) Patent No.: US 11,506,808 B2
(45) Date of Patent: Nov. 22, 2022

(54) OCEAN BOTTOM NODE WITH REMOVABLE ACOUSTIC PINGER

(71) Applicant: SERCEL, Carquefou (FR)

(72) Inventors: Alexis Duboué, Carquefou (FR); Jean-Jacques Vignaux, Carquefou (FR); Matthieu Gouriou, Carquefou (FR); Dominique Mainetti, Carquefou (FR)

(73) Assignee: SERCEL, Carquefou (FR)

( * ) Notice: Subject to any disclaimer, the term of this patent is extended or adjusted under 35 U.S.C. 154(b) by 320 days.

(21) Appl. No.: 16/519,148

(22) Filed: Jul. 23, 2019

(65) Prior Publication Data

US 2020/0326443 A1 Oct. 15, 2020

Related U.S. Application Data

(60) Provisional application No. 62/831,995, filed on Apr. 10, 2019.

(51) Int. Cl.
*G01V 1/38* (2006.01)
*G01V 1/18* (2006.01)
*G01V 1/24* (2006.01)

(52) U.S. Cl.
CPC ............ *G01V 1/3852* (2013.01); *G01V 1/186* (2013.01); *G01V 1/247* (2013.01); *G01V 1/3808* (2013.01)

(58) Field of Classification Search
CPC ........ G01V 1/38; G01V 1/3852; G01V 1/186; G01V 1/247; G01V 1/3808; G01V 1/3835; G01V 2210/1427
See application file for complete search history.

(56) References Cited

U.S. PATENT DOCUMENTS

| 6,024,344 | A | 2/2000 | Buckley et al. |
| 9,448,311 | B2 * | 9/2016 | Maxwell .................. G01V 1/18 |
| 9,933,537 | B2 * | 4/2018 | Gateman ................ G01V 1/186 |
| 10,322,783 | B2 * | 6/2019 | Valsvik ................ G01V 1/3808 |

(Continued)

FOREIGN PATENT DOCUMENTS

| CN | 2764716 Y | * | 3/2006 |
| CN | 2005007755 |   * | 3/2006 |
| GB | 2392245 A |   | 2/2004 |

OTHER PUBLICATIONS

William A. Prothero, William Schaecher; First noise and teleseismic recordings on a new ocean bottom seismometer capsule. Bulletin of the Seismological Society of America 1984;; 74 (3): 1043-1058. doi: https://doi.org/10.1785/BSSA0740031043 (Year: 1984).*

(Continued)

*Primary Examiner* — Ian J Lobo
(74) *Attorney, Agent, or Firm* — Patent Portfolio Builders PLLC

(57) ABSTRACT

An ocean bottom node for collecting seismic data, the ocean bottom node including a compounded housing including an electronics housing and a pinger housing, electronics located inside the electronics housing, and a battery pack configured to supply electrical power to the electronics. The pinger housing is permanently open to an ambient water while the electronics housing is sealed from the ambient water, and the pinger housing is configured to selectively and directly attach to the electronics housing.

17 Claims, 14 Drawing Sheets

(56) References Cited

U.S. PATENT DOCUMENTS

| | | | |
|---|---|---|---|
| 2008/0144442 A1* | 6/2008 | Combee | G01V 1/38 |
| | | | 367/131 |
| 2014/0198607 A1 | 7/2014 | Etienne et al. | |
| 2014/0219051 A1* | 8/2014 | Pavel | G01V 1/22 |
| | | | 367/14 |
| 2016/0245945 A1 | 8/2016 | Rokkan et al. | |
| 2016/0349387 A1 | 12/2016 | Rokkan et al. | |
| 2018/0341033 A1 | 11/2018 | Olivier et al. | |

OTHER PUBLICATIONS

David F. Willoughby, John A. Orcutt, David Horwitt; A microprocessor-based ocean-bottom seismometer. Bulletin of the Seismological Society of America 1993;; 83 (1): 190-217. (Year: 1993).*
International Search Report and Written Opinion in corresponding/related International Application No. PCT/IB2020/000329 dated Sep. 2, 2020.

\* cited by examiner

OCEAN BOTTOM NODE WITH REMOVABLE ACOUSTIC PINGER

BACKGROUND

Technical Field

Embodiments of the subject matter disclosed herein generally relate to methods and systems for seabed seismic acquisition and, more particularly, to an ocean bottom node that is configured to collect seismic data and have a removable acoustic pinger placed inside its compounded housing.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

For marine acquisition, such a high-resolution image may be obtained with a seismic acquisition system as now discussed. The seismic acquisition system 100 includes, as illustrated in FIG. 1, plural ocean bottom nodes 102 distributed over the ocean bottom 101, by various means. Each ocean bottom node 102 includes e.g., a hydrophone 104 for detecting a pressure wave, a processor 106 for processing the detected waves, a memory 108 for storing the seismic data, and a power source 110 for providing electrical power to these components. A vessel 120 tows one or more seismic sources 122 at a certain depth in the water, relative to the ocean surface 121. The seismic source 122 is configured to generate seismic waves 124. The seismic waves 124 propagate into the subsurface 126 and get reflected and/or refracted at various interfaces 128 in the subsurface. The reflected waves 130 are then detected by the hydrophone 104, and recorded in the memory 108 of the ocean bottom node 102.

A reliable autonomous positioning of the nodes might be necessary for various reasons, and a usual solution is the presence, in each node (see node 102' in FIG. 1) of an acoustic pinger 112, which is configured to send an acoustic signal, which is used to locate the node, for example, by triangulation. The pinger 112 is currently either fully incorporated inside the housing of the node, see, for example, node 102' in FIG. 1, together with the other electronics, or attached with a cable 114 to the node 102", as also illustrated in FIG. 1. Note that the cable 114 may extend between two nodes and the pinger 112 may be attached to this cable.

Each of these two approaches (i.e., pinger fully deployed inside the housing of the node, and pinger attached with a cable to the node) has its own disadvantage. The first approach is inflexible and expensive in the sense that each node has the pinger permanently locked inside the housing. However, there are situations when there is no need that each node has a pinger, but only certain nodes. For this situation, there is no easy way to remove the pinger from the nodes 102' that do not need the pinger. Thus, even when the seismic survey should have some of the nodes with no pinger, all the nodes have inside a corresponding pinger. In addition, the acoustic signal generated by the pinger is negatively impacted by the housing of the node, which is made of a thick and resistant material in order to resist to the large pressures that are present on the ocean bottom.

The second approach faces a different problem, as the pinger is free to take various positions when the node lands on the ocean bottom (note that typically the pinger is attached to a cable connecting two nodes) as the connection between the pinger and the node is soft, i.e., a cord or cable. For this approach, the pinger can land with its emitting head into the sand at the ocean bottom, or under the node itself, which is undesirable. In addition, the pinger needs to be manually attached to the desired nodes on the mother vessel, prior to the seismic survey, which is time consuming and prone to mistakes.

Further, the existing nodes are designed based on the water depth at which they operate and the required autonomy. Generally speaking, a lower autonomy is required for shallow water depth were the deployment methods use, for example, the Node-On-A Rope technique described in U.S. Pat. No. 6,024,344. This deployment method requires acoustic positioning of the nodes, and thus the use of a dedicated pinger. However, a long autonomy node is required for deep water applications where the nodes are generally deployed and positioned by ROV so they need more battery capacity, but do not require acoustic positioning. To address these two divergent requirements, most of the existing nodes have been designed to have two different configurations, one for shallow water and one for deep water, which involves different battery capacities, size and volume.

Another issue affecting the current nodes is the lack of mechanical strength and sensor support for the new microelectromechanical systems (MEMS) sensors. Most of the existing nodes are integrating the various components into different compartments: electronics boards and sensors in one compartment, batteries in another compartment, thus making the manufacturing of the house complex. The sensors used in these nodes are generally geophones, which are plagued by limitations in the low-frequency range.

There is thus a need to integrate MEMS sensors, which are more sensitive to low-frequency signals (i.e., less than 10 Hz). Nevertheless, the MEMS sensors need a good coupling and a support that does not deform when the case is exposed to high-pressure, as is the case on the ocean bottom.

Furthermore, because the nodes can be deployed in various ways, for example, with a rope or with an ROV, the requirements for attaching the appropriate deploying device to the nodes are different for these two methods. Thus, there is also a need for a node that can be easily adapted to have a correct connecting mechanism as required by the chosen deployment method.

SUMMARY OF THE INVENTION

According to an embodiment, there is an ocean bottom node for collecting seismic data. The ocean bottom node includes a compounded housing including an electronics housing and a pinger housing, electronics located inside the electronics housing, and a battery pack configured to supply electrical power to the electronics. The pinger housing is permanently open to an ambient water while the electronics housing is sealed from the ambient water, and the pinger housing is configured to selectively and directly attach to the electronics housing.

According to another embodiment, there is an ocean bottom node for collecting seismic data, and the ocean bottom node includes an electronics housing configured to hold electronics, a battery housing configured to house a battery pack, a removable pinger housing configured to house an acoustic pinger, and a strength plate configured to support a microelectromechanical sensor. At least a side of the strength plate is directly exposed to an external ambient of the node, and the pinger housing is configured to selectively and directly attach to the electronics housing.

According to still another embodiment, there is a method for recording seismic data with an ocean bottom node. The method includes selecting whether to attach an acoustic pinger and a pinger housing, or an additional battery pack and an additional battery housing, or neither of the acoustic pinger and the additional battery pack to a compounded housing of the node; attaching the acoustic pinger and the pinger housing or the additional battery pack and the additional battery pack housing to the compounded housing; locking the pinger housing with a latching mechanism to prevent the acoustic pinger to fall out of the pinger housing, when the pinger housing is present; deploying the compounded housing to the ocean bottom; and recording seismic data with a pressure sensor located in the pinger housing and a microelectromechanical sensor located inside the compounded housing.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
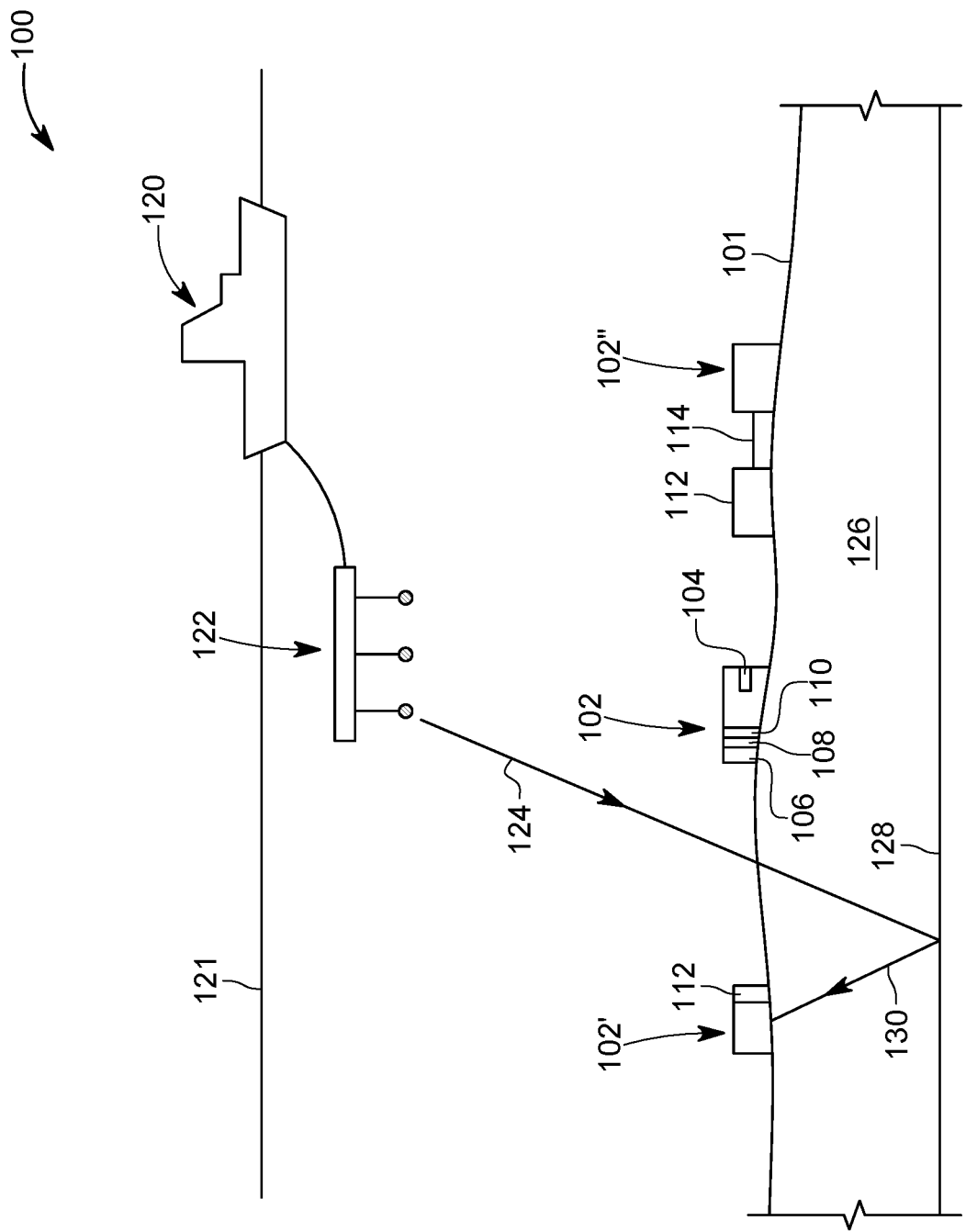
FIG. 1 illustrates a marine acquisition seismic system that uses ocean bottom nodes for collecting seismic data.

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is an ocean bottom node (OBN) that is configured to removably receive an acoustic pinger in a dedicated housing so that a head of the acoustic pinger may extend outside the housing of the OBN for achieving a good acoustic emission. The acoustic pinger may be easily removed from its dedicated housing when it is not needed. An additional battery pack (note that the node has by default a main battery pack) having a dedicated battery housing may be swapped with the acoustic pinger and its dedicated housing, for providing longer autonomy to the OBN. For this option, the battery housing of the additional battery pack is sealed from the environment, so that water does not enter inside. Also, a water tight electrical connection is present on the housing of the node and the housing of the battery housing so that electrical power from the additional battery pack can be transmitted to the electronics inside the node. Alternatively, the housing of the pinger is fixedly attached to the housing of the node and the acoustic pinger and the additional battery pack are configured to be selectively placed into the same housing. Thus, the acoustic pinger can be selectively attached to the OBN, depending on the requirements of each seismic survey.

A connecting mechanism is removably attached to a compounded housing of the OBN and this connecting mechanism is being used for attaching to the ROV or a rope for deploying purposes. The connecting mechanism can be replaced, as needed, with another connecting mechanism in a short time. The compounded housing of the node includes a strength plate that is connected between dedicated housing parts. The strength plate is designed to prevent deformation. The strength plate is made of a material that does not deform under the pressures experienced at the ocean bottom. The strength plate is also placed in the compounded housing to support two adjacent housing parts and extends all the way from one side of these adjacent housing parts to an opposite side of them. MEMS sensors are directly attached to the strength plate and thus they can record low-frequency seismic signals. This novel node is now discussed in more detail with regard to the figures.

Figure 2:
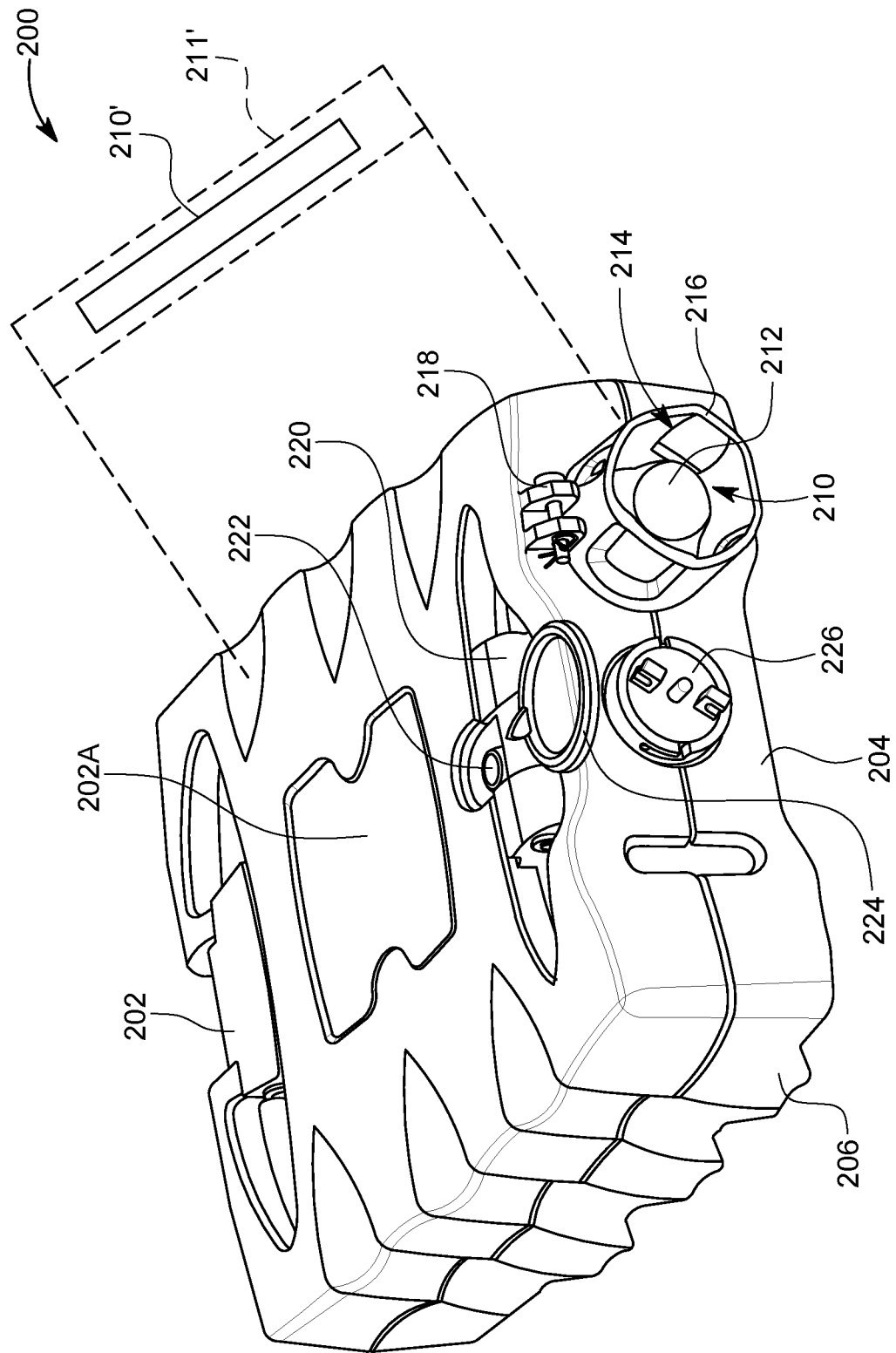
FIG. 2 illustrates an ocean bottom node that has a removable acoustic pinger.

FIG. 2 shows a novel OBN 200 that is configured to removably receive an acoustic pinger 210. The acoustic pinger 210 is almost completely located inside the compounded housing 202 of the OBN 200, as illustrated in the figure, except for its head 212, which partially protrudes outside from the compounded housing. The head 212 is the portion of the pinger that physically emits the ping signal. This configuration ensures that the head of the acoustic pinger can freely emit the ping. The acoustic pinger 210 may be secured to the compounded housing 202 with a latching mechanism 214. However, as soon as the latching mechanism 214 is removed or opened, the acoustic pinger 210 can be removed from the compounded housing, to be replaced with another acoustic pinger if necessary. In one embodiment, the acoustic pinger is pressfit into the pinger housing and no latching mechanism is required. Alternatively, the acoustic pinger and its housing can be replaced in their entirety with an additional battery pack 210' and its housing 211', which is shown in FIG. 2 next to the compounded housing 202. The additional battery back 210' is a secondary battery pack for the node, as the node already includes a main battery pack, as will be discussed later. Thus, the operator of the OBN 200 can selectively attach either the acoustic pinger 210 and its housing or the additional battery pack 210' and its housing 211' to the node. In one embodiment, the operator of the node can in fact select to not place anything in the place reserved for the acoustic pinger or the additional battery pack. The node is perfectly able to function without the acoustic pinger or the additional battery pack. Note that to selectively attach the acoustic pinger 210 or the additional battery pack 210' to the compounded housing 202, the operator needs only to remove one of these two elements and its housing, and then attach the other one and its housing. In one embodiment, the acoustic pinger is hold inside its housing with a latching mechanism, which is implemented as a collar 216 locked with a pin 218 to the compounded housing. Therefore, the operation of selectively attaching the acoustic pinger and its housing or the additional battery pack and its housing to the other elements of the compounded housing is quick and does not require to open up the compounded housing of the node. Note that the time consuming part of the traditional nodes is opening up the housing that hosts the electronics and removing the acoustic pinger from that housing. For the nodes discussed herein, the housing in which the electronics reside is not opened for replacing the acoustic pinger.

The acoustic pinger 210 is a traditional device that is configured to emit a ping at a given time interval, so that the operator of the node can locate the node when deployed on the ocean bottom. The ping emitted by the acoustic pinger may be encoded with a unique ID so that each acoustic pinger can be identified from its emitted ping. The acoustic pinger may be configured in one application to operate independent of the electronics located inside the compounded housing. This means that for this configuration, there is no electrical communication between the electronics housing and the pinger housing. If this is the case, then the operator needs to program the acoustic pinger before launching the node. However, if there is an electrical connection between the acoustic pinger and the electronics from the compounded housing, then it is possible that a processor or controller of the electronics is configured to communicate with the acoustic pinger and instruct the pinger when to send a ping, when to be idle, when to enter a sleep state, when to become active, etc. In one application, it is possible that the acoustic pinger is configured as an acoustic modem that can communicate two ways with the mother vessel at the surface or an ROV. In this way, when the seismic survey is started, the vessel or ROV can send an appropriate command to the acoustic pinger, which is interpreted by the controller of the node as a signal to stop or place the acoustic pinger in a sleep state, to not interfere with the acquisition of the seismic data. When the seismic survey is over, the vessel or ROV sends another command to the acoustic pinger, which is interpreted by the controller of the node as a signal to wake up the acoustic pinger so that the ROV can determine the location of the node and then retrieve the node.

FIG. 2 also shows a connecting mechanism 220 that is removably attached, for example, with a screw 222, to the housing of the OBN. While the connecting mechanism 220 is shown in the figure having a ring 224, it may have a hook or other shaped element as necessary for the selected deploying method. In other words, depending on the selected method for deploying the OBNs, an appropriate connecting mechanism is selected by the operator and then attached to the compounded housing of the node.

Figure 3:
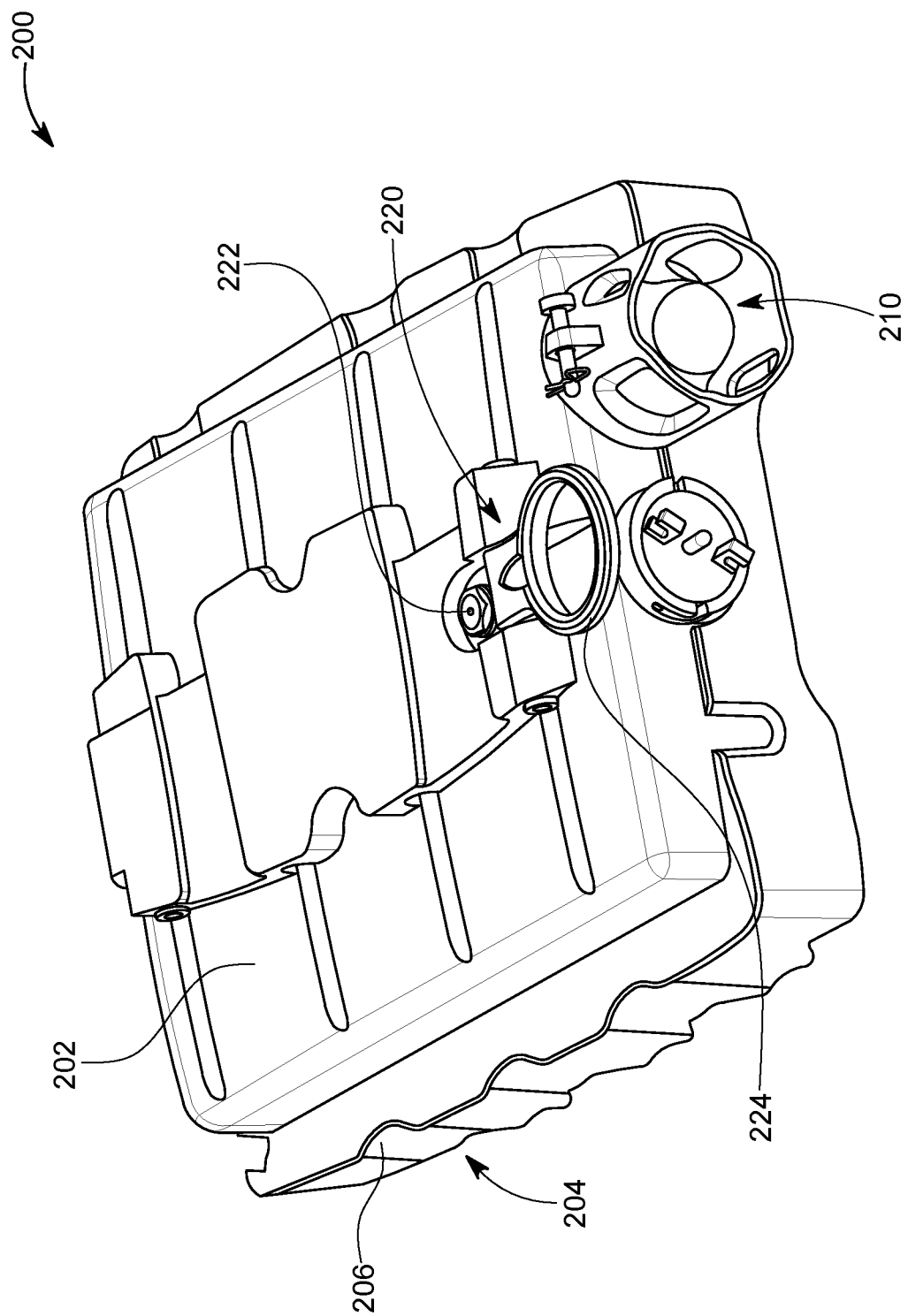
FIG. 3 illustrates an ocean bottom node that has a removable connecting mechanism.

Regarding the compounded housing 202 of the OBN 200, FIGS. 2 and 3 show that a protective cover 204 or jacket is placed over the compounded housing for protection from accidental bumping with the vessel, ROV, or stones on the ocean bottom. However, the protective cover is designed in such a way that bottom or top portions 202A or both of the compounded housing 202 are in direct contact with the water or the soil at the ocean bottom. Note that FIG. 2 shows only a top portion 202A of the compounded housing 202 being directly exposed to the ambient. However, there is a corresponding bottom portion (not shown in this figure) that is not covered by the protective cover 204 so that the bottom portion is in direct contact with the ocean bottom. This direct coupling between the compounded housing 202 and the ocean bottom ensures that the small-frequencies movements of the particles of the ocean bottom are detected by the MEMS sensor located inside the node.

While the compounded housing 202 is made of a strong material, for example, titanium, for resisting to the large hydrostatic pressure present on the ocean bottom, the protective cover 204 may be made of a plastic or ceramic material, to protect the compounded housing 202 from accidental hits from the vessel carrying the node, or the ROV deploying the node, or from stones located on the ocean bottom. In one embodiment, the protective cover 204 has plural legs 206 that are configured to engage with the ocean bottom material and stabilize the node relative to the ocean bottom. The compounded housing 202 may be shaped as a flat pack or as a box, as shown in FIG. 2, having the bottom base larger than the other sides so that a landing of the node on the base is likely. The compounded housing 202 may be differently shaped if necessary.

FIG. 2 also shows a removable cap 226 that is configured to seal an electrical connection located inside the housing so that water cannot reach the electrical connection or the inside of the compounded housing that stores the electronics. However, when the node is brought to the surface, the cap 226 can be removed (e.g., can be unscrewed from the housing) to expose the electrical connection, so that the electrical connection may be connected to electrical power from the vessel for recharging the battery and/or to a server for downloading the collected seismic data. Note that the electrical connection is electrically connected to the electronics inside the compounded housing and constitutes a gate to the memory and power supply of the node.

Figure 4:
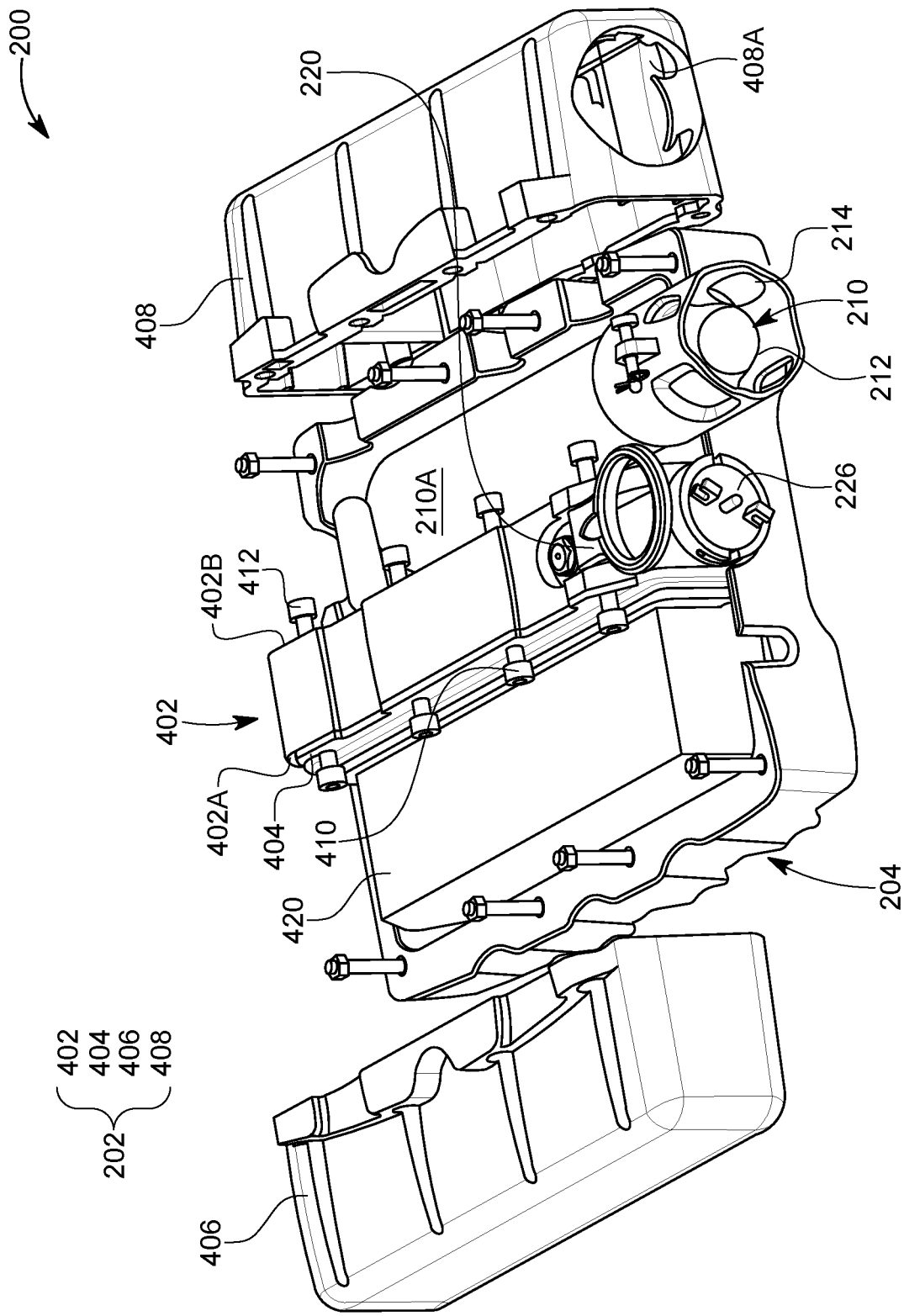
FIG. 4 shows an exploded view of the ocean bottom node having the removable acoustic pinger.

The compounded housing 202 is not made as a single enclosure or bay, but rather includes plural, separate housings, which fit together as illustrated in FIG. 4. These separate housings include, but are not limited to, an electronics housing 402, a strength plate 404, a battery housing 406, and a pinger housing 408. Note that other specific housings may be added if necessary. For example, if a seismic survey demands the node to collect data over a period of time that lasts longer than the time that the internal battery of the node is supposed to provide power, it is possible to add another battery housing between the battery housing 406 and the strength plate 404, or to replace the existing battery housing 406 with another, larger, battery housing, or to replace the pinger housing 408 and the acoustic pinger 212 with the additional battery pack 210' and the additional battery housing 211'. However, this modular configuration of the compounded housing allows greater flexibility in preparing the node for any seismic acquisition campaign.

The strength plate 404 and the battery housing 406 can be attached, for example, with screws 410, to a first side 402A of the electronics housing 402, while the pinger housing 408 can be attached, also with screws 412, to a second, opposite side 402B of the electronics housing 402, as shown in FIG. 4. The strength plate 404 may extend along the entire first side 402A of the electronics housing 402 and is made of a high-strength material, for example, titanium based material, so that this element of the housing not only remains unbended when deployed to the ocean bottom, but also imparts strengths to the entire compounded housing 202. In this embodiment, the connecting mechanism 220 is attached directly to the electronics housing 402. However, it is possible to attach the connecting mechanism to other parts of the compounded housing 202.

The battery housing 406 is shown in FIG. 4 being removed from the electronics housing 402 so that a battery pack 420 is visible. The battery pack 420 is the main source of electrical power for the electronics of the node and thus, it is electrically connected to one or more sensors and other electronic components of the node, as discussed later. The pinger housing 408 is also shown in the figure being removed from the electronics housing 402 so that the entire body 210A of the acoustic pinger 210 is visible. Note that most of the body 210A of the acoustic pinger 210 is located inside the pinger housing 408 with only the head 212 of the pinger being showed protruding out of the pinger housing, through a corresponding hole 408A, for the reasons already discussed above. FIG. 4 also shows that the battery housing 406 and the electronics housing 402, when attached to each other, completely seal their contents (i.e., battery pack and electronics) from the sea water, while the pinger housing 408, to the contrary, even when fully attached to the electronics housing 402, is completely open to the sea water. For this reason, the interior of the electronics housing 402 does not fluidly communicate with the interior of the pinger housing 408.

Figure 5A:
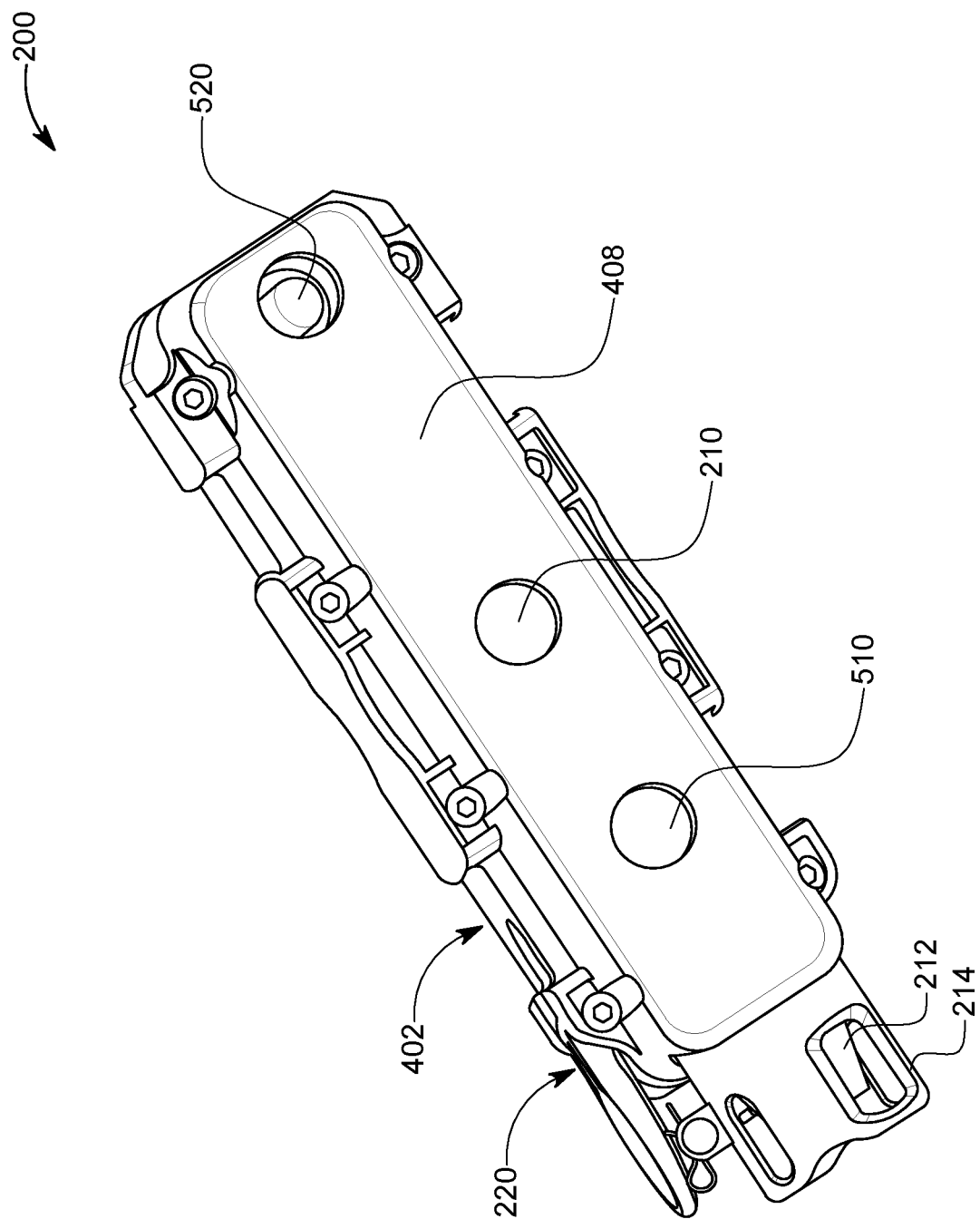
FIGS. 5A to 5F illustrate various details of the ocean bottom node that includes the removable acoustic pinger and a microelectromechanical sensor placed on a strength plate.

As better seen in FIG. 5A, the pinger housing 408 has plural slots or holes 510 that allow the ambient water to freely enter inside the pinger housing. FIG. 5A also shows a hydrophone 520, or equivalent pressure sensor, being placed inside the pinger housing. In one application, the hydrophone 520 is physically attached to the side wall 402B of the electronics housing 402 and has an electrical connection that extends through the side wall 402B, so that pressure data recorded by the hydrophone 520 is transmitted to the electronics in the electronics housing 402. However, the electronics housing 402 does not fluidly communicate with the pinger housing so that no water can enter inside the electronics housing.

Figure 5B:
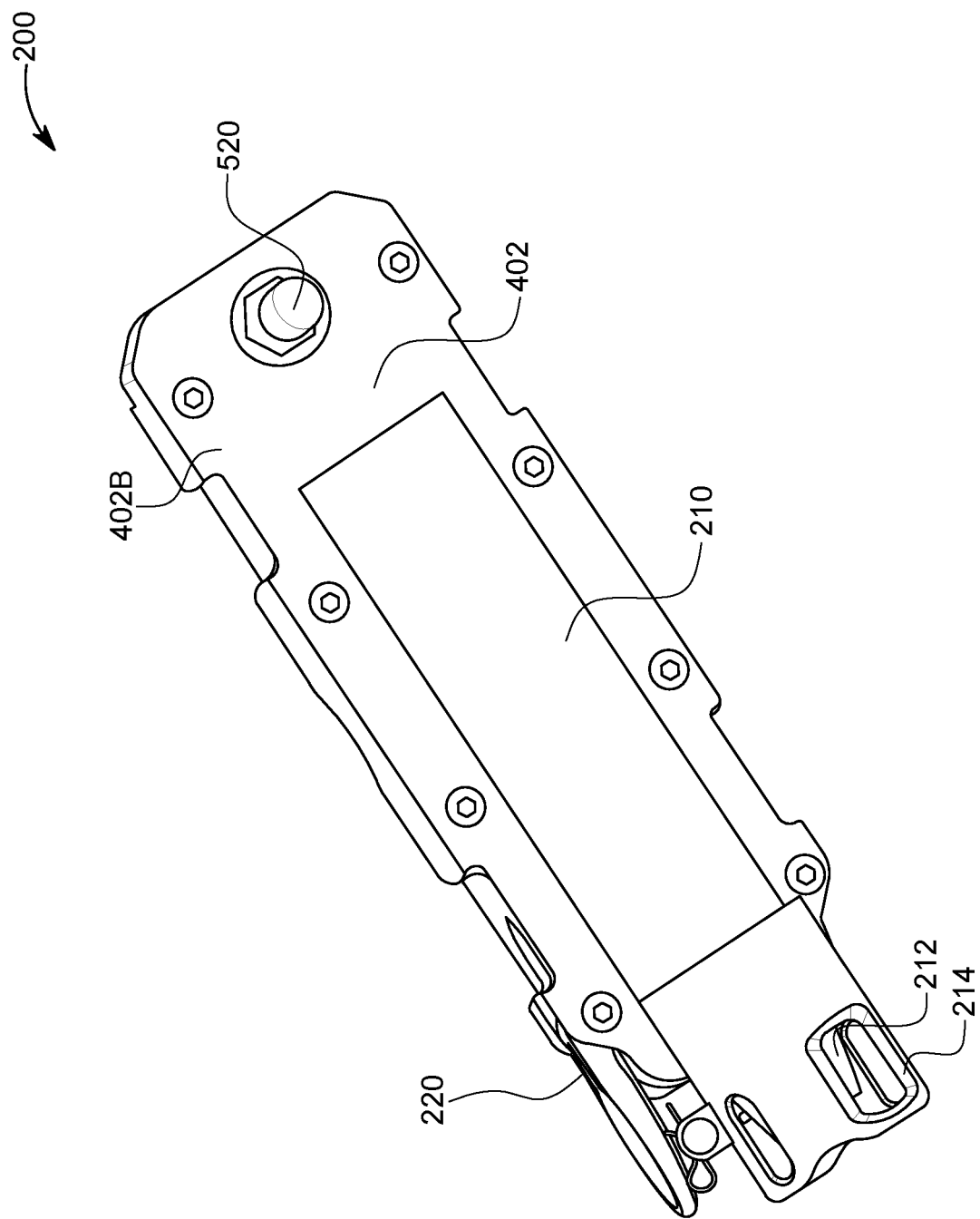

The acoustic pinger 210 is visible in FIG. 5A through the holes 510. Also, the head portion 212 of the acoustic pinger is also visible in this figure extending past the pinger housing. FIG. 5B shows the second side 402B of the electronics chamber 402 fully exposed as the pinger housing 408 has been removed. The full acoustic pinger 210 is now visible. Also visible is the entire hydrophone sensor 520, that is also placed inside the pinger housing 408. The reason for placing the hydrophone sensor 520 inside the pinger housing is twofold: the hydrophone sensor needs to be directly exposed to the ambient water to detect the changes in the water pressure and it also needs to be protected from possible damage while being exposed to the ambient. The perforated pinger housing 408 achieves both of these goals.

Figure 5C:
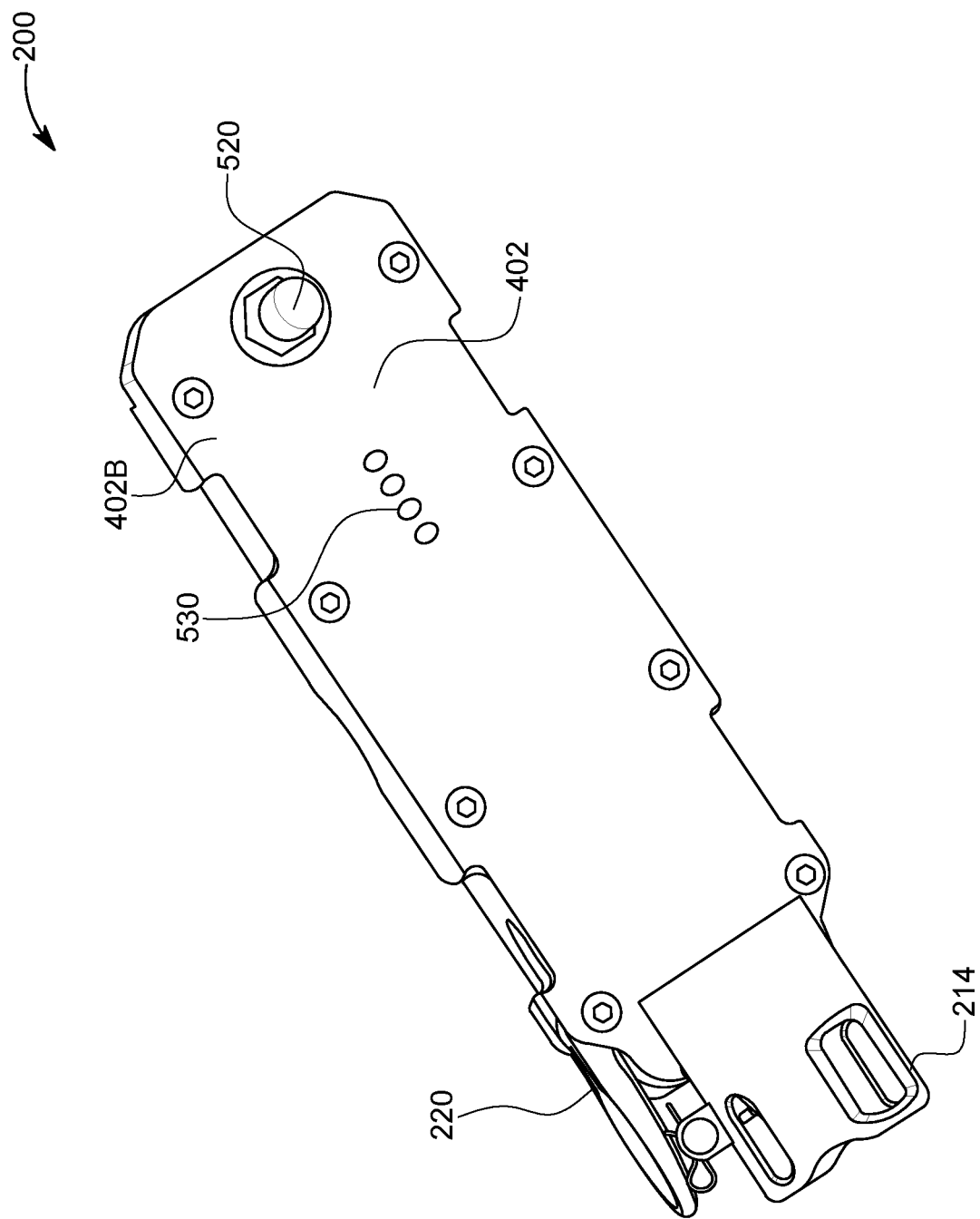

FIG. 5C shows the acoustic pinger 210 removed from its location, which exposes an optional electrical connection 530 between (i) the electronics housing 402 and (ii) the pinger housing 408 or the additional battery housing 211'. The electrical connection 530 is not necessary for the acoustic pinger 210 as this element is configured to operate independent of the electronics of the node. However, if the acoustic pinger 210 and the pinger housing 408 are replaced with the additional battery housing 211', then the additional battery 210' uses the electrical connection 530 to transfer electrical power between the electronics housing and the additional battery housing. For this situation, the electrical connection is configured to be water tight, i.e., no water from the additional battery housing can enter inside the electronics housing. In one application, the electrical connection 530 is connected to one or more of the electronic components inside the electronics housing, e.g., a battery pack, and also to the acoustic pinger 210. In one embodiment, the electrical connection 530 is optional as the acoustic pinger 210 does not need an external power source, as this element has its own power source. However, if the electrical connection 530 is present, when the acoustic pinger 210 is replaced with the additional battery pack 210' shown in FIG. 2, the additional battery pack is configured to electrically connect to the electrical connection to transfer power to the electronics inside the electronics housing. In this way, the autonomy of the node can be extended.

Figure 5D:
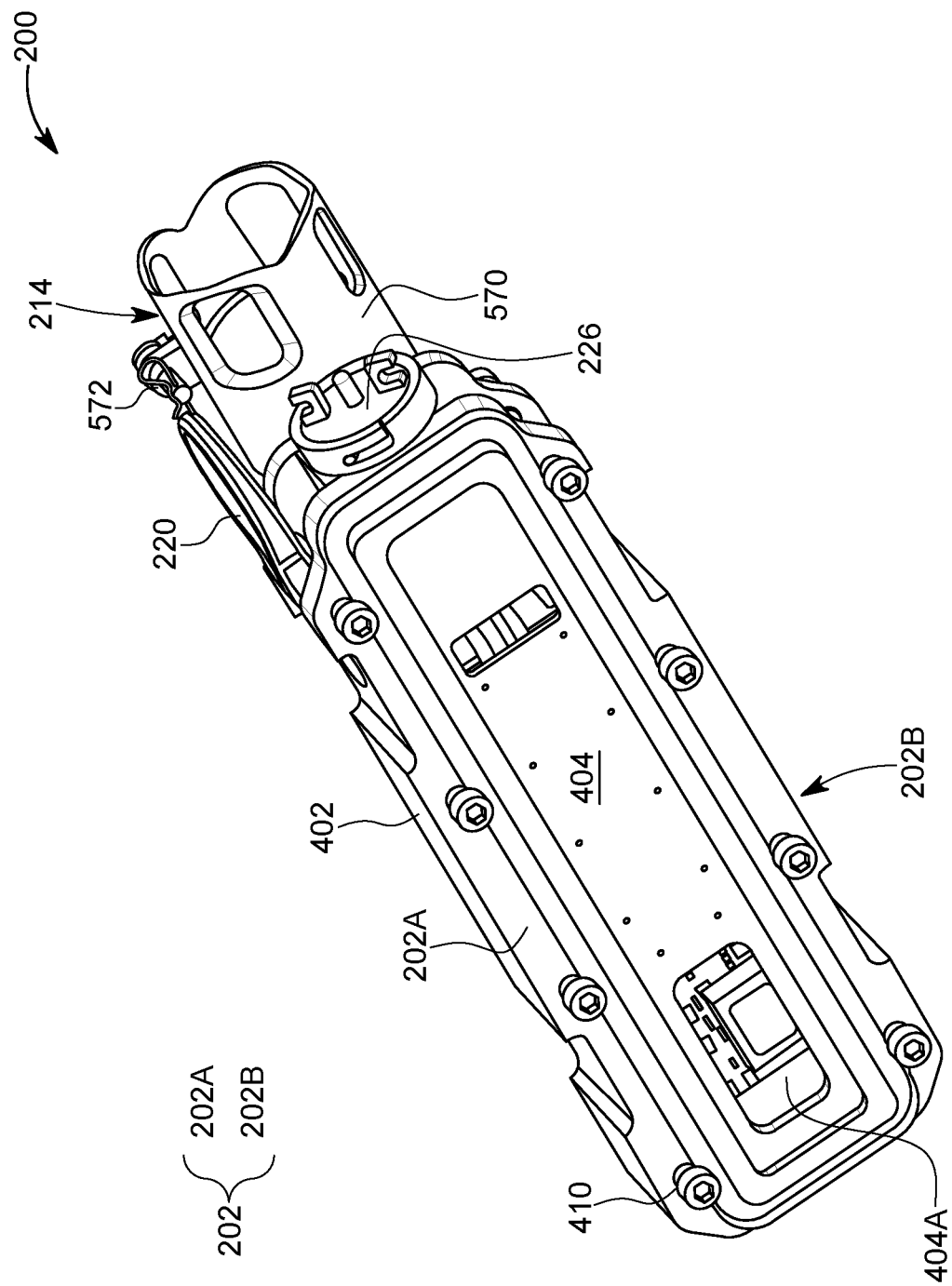

FIG. 5D shows a view of the OBN 200 in which the battery housing 406 and the battery pack 420 have been removed, so that the strength plate 404 is fully visible. A slot 404A is formed in the strength plate 404 for allowing electrical connections to extend from the battery pack to the electronics inside the electronics housing 402. The strength plate 404 is located to be substantially perpendicular to the base 202B of the compounded housing 202. FIG. 5D shows both the top 202A and the bottom 202B of the compounded housing 202. In one embodiment, the strength plate is designed such that its top and bottom sides are directly exposed to the ambient, so that a good coupling between the plate and the ambient is achieved. This coupling is important for the MEMS attached to the strength plate to be able to detect low-frequency particle movement.

Figure 5E:
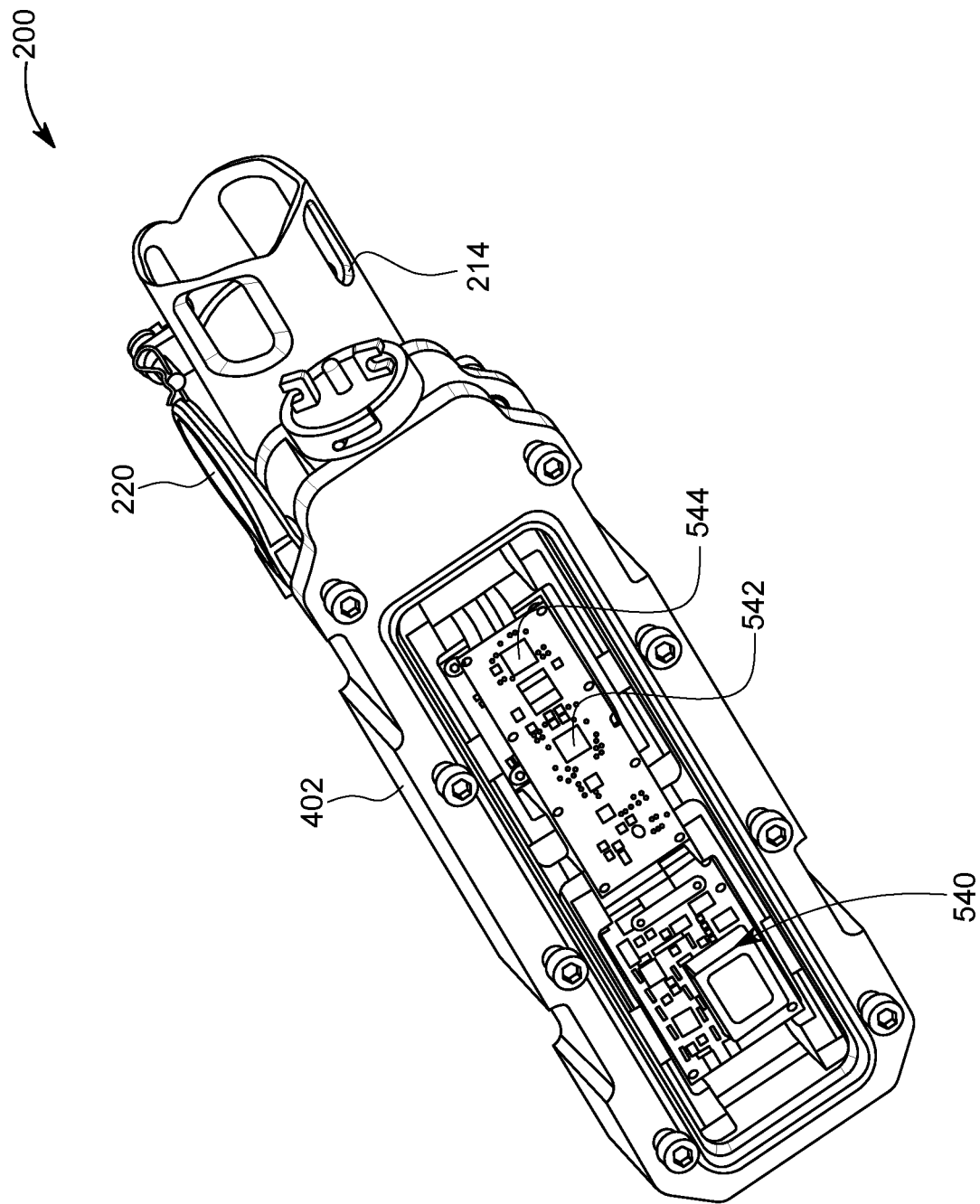
Figure 5F:
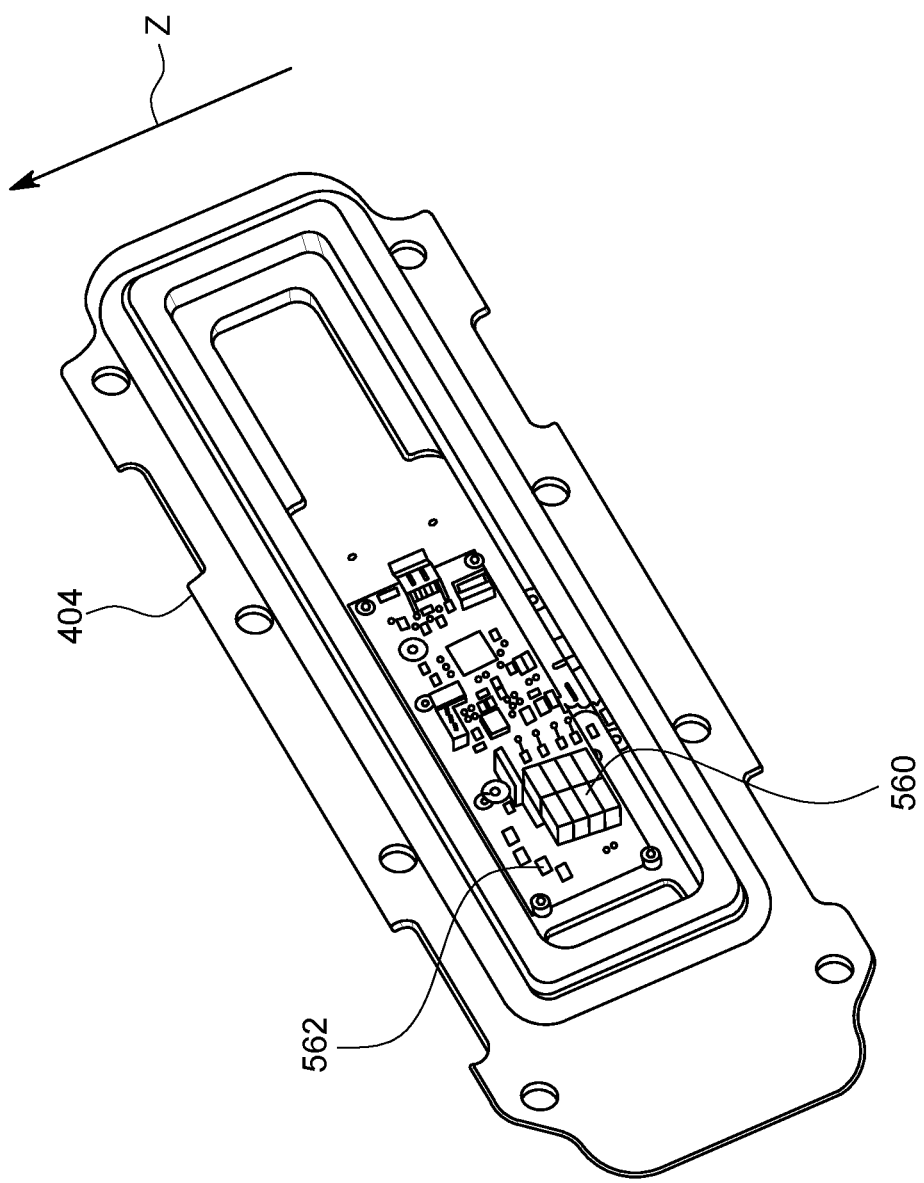

If the strength plate 404 is removed as illustrated in FIG. 5E, the electronics 540 is visible inside the electronics housing 402. The electronics 540 may include a processor 542 and a memory 544. In one embodiment, the electronics 540 include plural components that are discussed later. FIG. 5F shows a MEMS sensor 560 that is attached to circuit board 562, which in turn is directly attached to the strength plate 404. By having this configuration, the large pressure exerted by the water pressure does not affect the readings of the MEMS sensor as the strength plate is not deformed by the water pressure along the Z direction. To this factor contributes the fact that the strength plate 404 is placed in the node 200 so that when the node lands in an expected position as illustrated in FIG. 2, the strength plate is disposed perpendicular to the base 202B of the node, so that there is minimal water pressure/force exerted directly and vertically on the plate.

While FIG. 5F shows a MEMS sensor 560, those skilled in the art would understand that more MEMS sensors may be present. In one embodiment, other sensors may be located on, or connected to the circuit board 562, as for example, a geophone, a particle motion sensor, or another device that is configured to determine a particle motion. The MEMS sensor may be a single-axial sensor, for recording a particle motion along a single axis, or a multi-axis sensor, for recording a particle motion along two or three perpendicular directions. Additional sensors may be added, as for example a compass, tilt sensor, magnetometer, salinity sensor, temperature sensor, etc. While the embodiments discussed above refer to a hydrophone 520, any pressure sensor or pressure differential sensor may be used instead of or in addition to the hydrophone. In one embodiment, both a scalar pressure sensor and a three-axial particle motion sensors are provided, thus having a 4-C component inside the compounded housing. For this configuration, note that the particle motion sensor is placed inside one housing element while the pressure sensor is placed in a different housing element and these two housing elements are separated from each other and not in fluid communication with each other. However, these two housing elements may be in electrical communication with each other. While the embodiments discussed above disclosed that the pressure sensor (hydrophone) is placed to be in direct contact with the ambient water while the particle motion sensor (MEMS) is placed inside a sealed housing for preventing direct contact between the water, one skilled in the art would understand that it is possible to place a particle motion sensor in the pinger housing, i.e., in direct contact with the water, if the MEMS sensor is encapsulated in a protection material that prevents the water to corrode the sensor.

The electronics 540 may also include, in addition to the processor and memory discussed above with regard to FIG. 5E, a data acquisition circuit with a combination of memory units for storing the acquired seismic data. The electronics 540 may also include a clock circuit to generate a clock signal that is used to stamp the acquired seismic data. Other electronics that are used typically in an ocean bottom node may be included.

Figure 6:
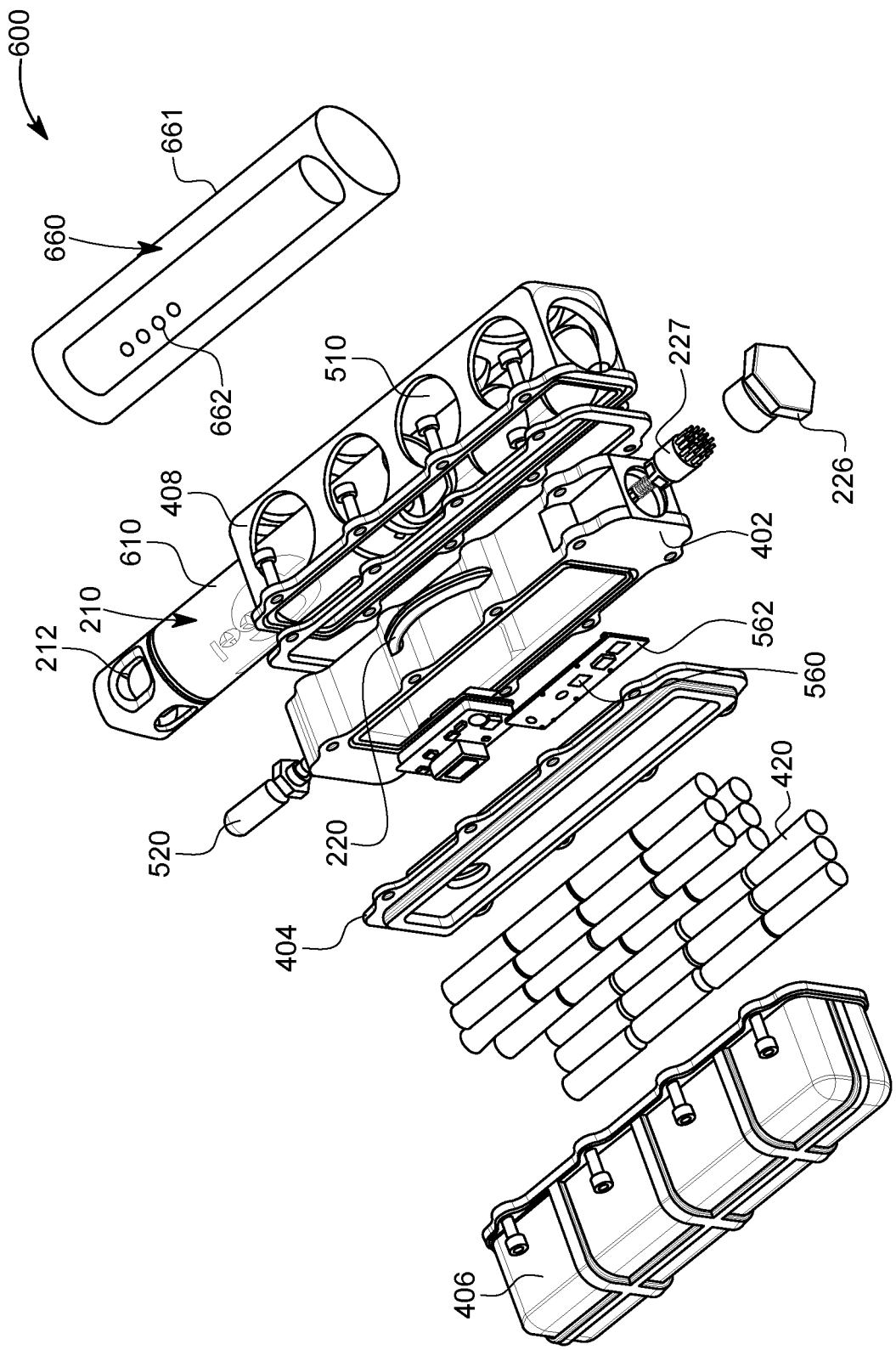
FIG. 6 illustrates another ocean bottom node that includes a removable acoustic pinger and a microelectromechanical sensor placed on a strength plate.

FIG. 6 shows a slightly modified OBN 600 relative to the OBN 200. In this embodiment, the acoustic pinger 210 is placed in a sleeve 610 and this sleeve is attached to the pinger housing 408. The pinger housing 408 is shaped in this embodiment more like a cage, with many openings for allowing the sea water to freely move through the pinger housing. The sleeve 610 may be sized to friction fit or press fit inside the pinger housing 408, so that latching mechanism 214 is not necessary to be present to secure the acoustic pinger 210 to the pinger housing 408. Note that in one embodiment, the acoustic pinger 210 may be configured with external threads to be screwed into the acoustic housing or may be secured to the pinger housing with the latching mechanism 214. A combination of these elements may also be used. The latching mechanism 214 is shown in FIG. 5D to include a collar 570 and a pin 572 which holds the collar 570 attached to the pinger housing. If the pin 572 is removed, the collar 570 can be removed or opened and the acoustic pinger 210 can be removed. Other means for attaching the acoustic pinger 210 to the pinger housing may be used.

Returning to FIG. 6, it further shows an electrical connection 227 that is sealed by cap 226. The electrical connection 227 may be connected through one or more wires to one or more of the processor 542, memory 544, and/or other electronics, like, for example, hydrophone 520 or MEMS 560. The connecting mechanism 220 may be implemented in this embodiment as a simple handle. FIG. 6 also shows an additional battery pack 660 and corresponding additional battery housing 661 which can be used to replace the acoustic pinger 210 and its corresponding housing. If a decision is made that there is no need for the acoustic pinger, this unit is removed together with the pinger housing and the additional battery pack 660 and its housing 661 are attached to the electronics housing 402, as previously discussed. The additional battery housing 661 has electrical connectors 662 that are configured to match the electrical connection 530 (see FIG. 5C) to transmit electrical power to the inside of the electronics housing 402, as previously discussed. However, in one embodiment, instead of removing the acoustic pinger and its housing to add the additional battery pack and its housing, it is possible to configure the additional battery pack to fit into the pinger housing and thus, to only swap the acoustic pinger with the additional battery pack while the pinger housing stays attached to the electronics housing. For this embodiment, the additional battery pack 210' or 660 would have the electrical connectors 662 located directly onto the pack so that the additional battery pack can electrically connect to the electronics from the electronic housing. Also, for this embodiment, the additional battery pack could be pressfit into the pinger housing or locked in place with the latching mechanism 214.

Figure 7:
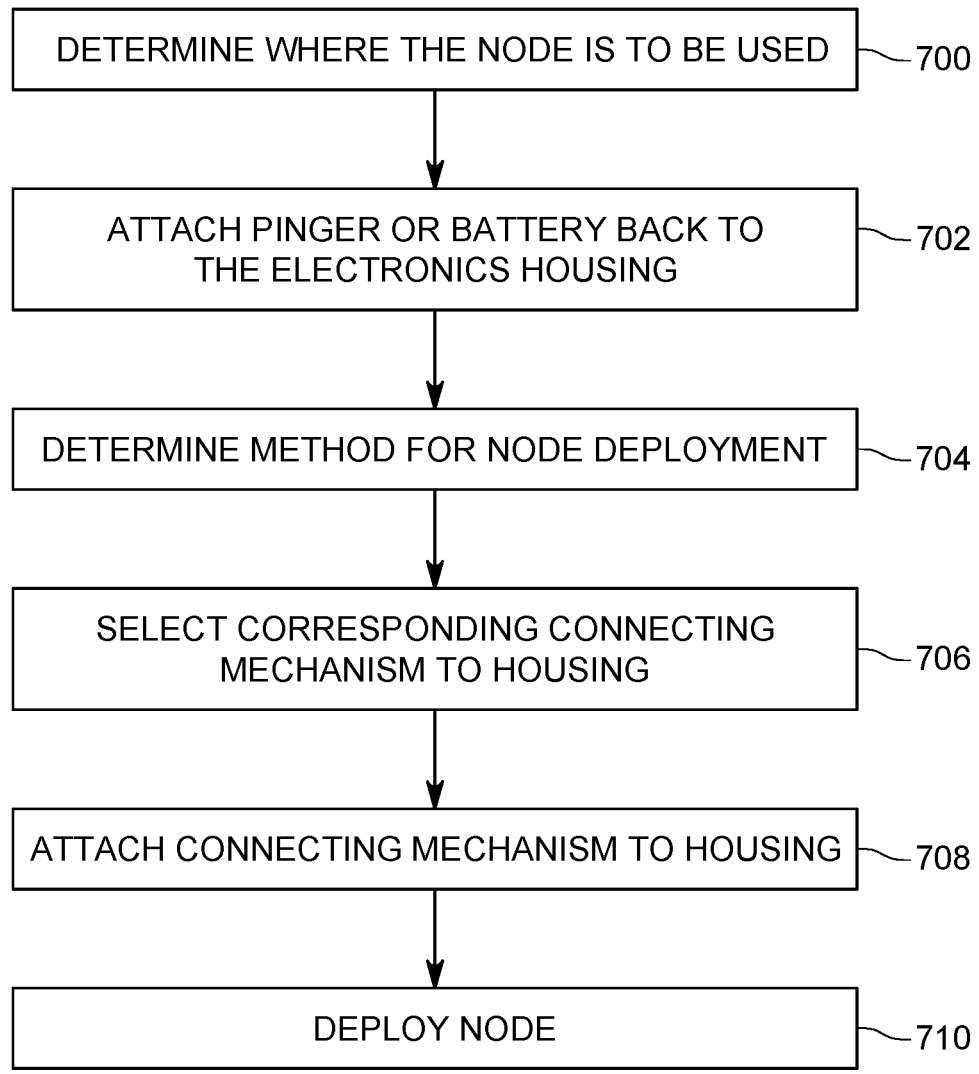
FIG. 7 is a flowchart of a method for deploying the ocean bottom node having or not the acoustic pinger.

A method for deploying the OBN 200 or 600 is now discussed with regard to FIG. 7. In step 700, a determination is made whether the node is to be used in shallow water or deep water or other type of specific operations. Depending on the determination made in step 700, either the acoustic pinger 210 and its housing or the additional battery pack 660 and its housing are selectively attached, in step 702, to the electronics housing. Alternatively, it is possible for the operator to leave the pinger housing empty, i.e., to place neither the acoustic pinger, nor to attach the additional battery pack to the electronics housing. In one application, the acoustic pinger is simply placed by press fit inside the pinger housing, with no direct connection between the acoustic pinger and the interior of the housing. However, in another embodiment, it is possible to physically attach the acoustic pinger to the pinger housing, for example, with a clamp or with threads.

After the acoustic pinger or the additional battery pack is attached to the electronics housing, the latching mechanism, if present, may be closed to prevent the acoustic pinger to fall out of the node while the node is being deployed. Note that while the node is being deployed, it can tumble while traveling toward the ocean bottom, and thus there is the possibility for the acoustic pinger to be ejected from the pinger housing if the latching mechanism is not closed. In one application, as previously discussed, it is possible to decide to place no pinger in the pinger housing, and to deploy the node with the pinger housing empty. The fact that the acoustic pinger or the additional battery pack can be so quickly attached to the electronics housing makes this step possible for the node 200, which is not the case for the existing nodes.

This feature enables the preparatory missions, wherein usually larger batteries are needed and precise localization is accomplished in another way than through node pinger, to be made with same node material as the true survey requiring pingers. This feature also allows an easy change in configuration between preparatory missions and offers great flexibility for configuring the node just before launching, i.e., while being stored on the deploying vessel. In other words, just before launching the nodes into the water, the nodes are likely stored on a mother vessel, where they are arranged in a storage closet. Just minutes or hours before loading the nodes on an ROV or on a rope for being deployed into the water, the operator of the node can decide to attach the acoustic pinger, or to attach the additional battery pack to the electronics housing and can implement this goal in a matter of minutes if not seconds. This is not possible for the existing nodes because either the pinger is sitting deep inside a sealed housing, that requires a substantial time effort for being opened, or if the pinger is attached with a rope to the node, then that pinger cannot be secured inside the housing, as is the case for the novel node discussed herein.

In step 704, a determination is made about the method used to deploy the node, and based on this determination, in step 706, an appropriate connecting mechanism 220 is selected. This is also an advantage of the current node that is not found in the existing nodes. The fact that the connecting mechanism 220 is easily removable from the compounded housing 202, makes it straightforward for the operator of the node to decide, while on the mother vessel, what connecting mechanism to attach to the node. Then, based on that decision, the connecting mechanism can be attached with one or more screws to the housing, which is not only low effort, but also quick.

In step 708 the connecting mechanism is attached to the housing of the node. Note that this step can take place on the vessel, just before the node is being deployed. Then, in step 710 the node is deployed in water at its intended position, using the selected deployment method. Because of the flexibility of attaching the connecting mechanism to the housing of the node, the operator of the node can decide just before launching the node to change the original deployment method, and to quickly replace the connecting mechanism originally attached to the node with another connecting mechanism that fits the newly selected deployment method. This flexibility in reconfiguring the node while on the mother vessel is due to the modular nature of the node as discussed above with regard to the figures.

Figure 8:
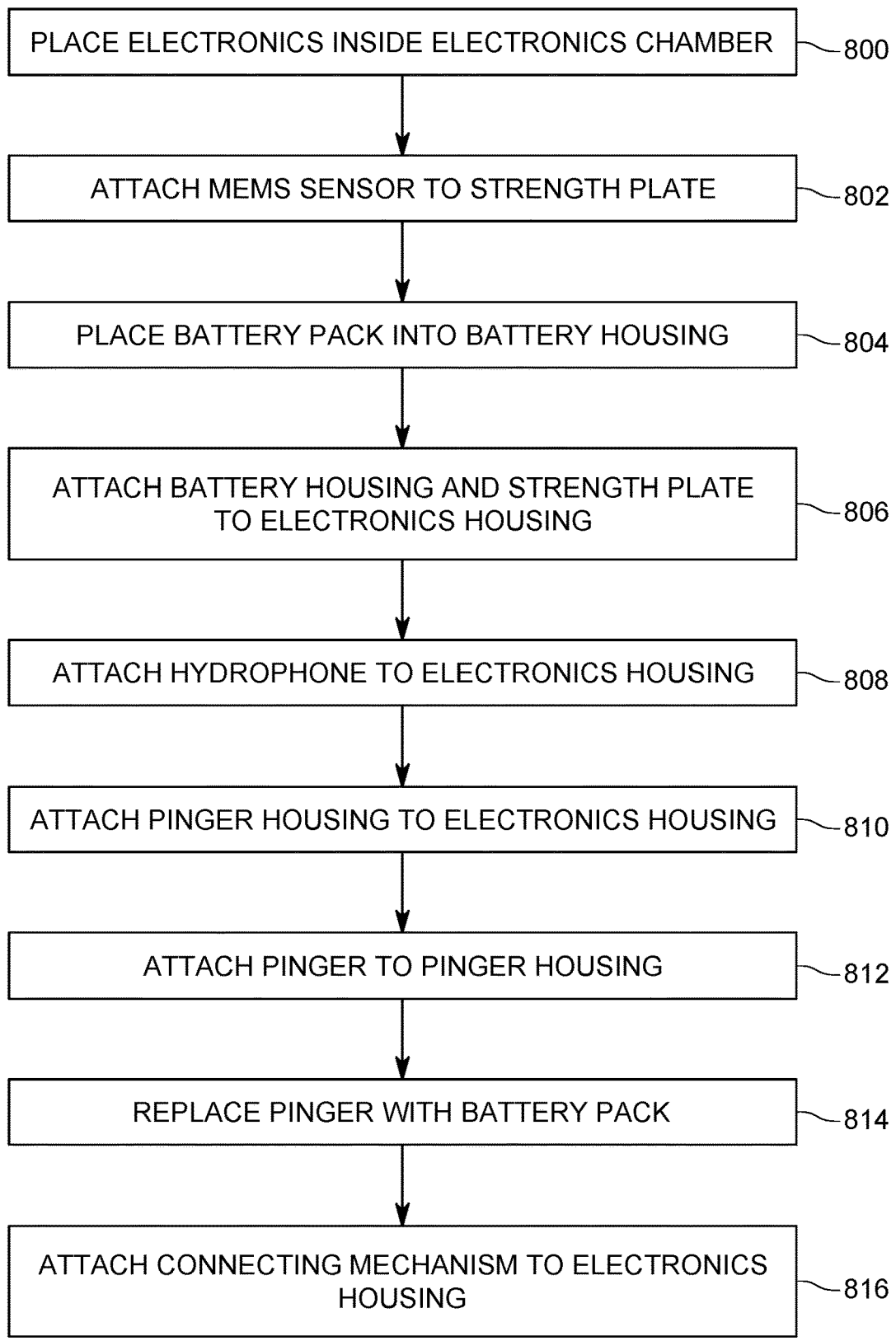
FIG. 8 is a flowchart of a method for assembling the ocean bottom node.

A method for assembling the node 200 or 600 is now discussed with regard to FIG. 8. In step 800, the electronics of the node are placed in the electronics housing 402. In step 802, a MEMS sensor 560 and its corresponding circuit board 562 are directly attached to a strength plate 404. As previously discussed, more than one MEMS sensor may be attached to the strength plate. In fact, other sensors may be attached to the strength plate. Note that the because the strength plate is placed during assembly between the battery housing and the electronics housing, and because these two housing elements are configured to have a larger combined base that the other sides of the node, it is very likely that the base would seat directly onto the ocean bottom while the strength plate would seat perpendicular to the ocean bottom.

Then, in step 804, a battery pack 420 is placed in the battery housing 406, and in step 806 the strength plate 404 and the battery housing 406 are attached, in this order, with screws to the electronics housing 402. In step 808, the hydrophone 520 is attached to the outside of the electronics housing 402 and in step 810 the pinger housing 408 is attached with screws to the electronics housing 402, on a face opposite to the face where the battery housing is located. In step 812, an acoustic pinger 210 is placed into the pinger housing 408. In optional step 814, the acoustic pinger 210 and its housing 408 are removed from the electronics housing and an additional battery pack 660 and its housing 661 are attached to the electronics housing. In step 816, a connecting mechanism 220 is selected and attached to the electronics housing 402, for example, with a screw.

It is noted that the node 200 or 600 advantageously has the option of adding the acoustic pinger as needed, without opening the housing or requiring any time-consuming work. In addition, the place of the acoustic pinger and its housing may be taken up by an additional battery pack and its housing, to prolong the recording capabilities of the node. In addition, the node can be supplied with different connecting mechanisms, depending on the deploying method, and the connecting mechanism can be quickly added to the housing with one or more screws. In one embodiment, it is possible to attach the connecting mechanism to the housing of node with a snap mechanism, with no screws.

By selectively attaching the acoustic pinger and the pinger housing to the electronics housing, or the additional battery pack and its housing, or in fact any other desired device, makes the node 200 or 600 to be highly modular. Also, the compounded housing 202 is highly modular, as each of the electronics housing 402, the strength plate 404, the battery housing 406, and the pinger housing 408 can be selectively placed together in the order shown in FIG. 4 or in a different order if so desired. One skilled in the art would understand that the operator of the node may decide to omit in its entirety one of these housing elements, for example the strength plate, in which case the MEMS sensor and associated board may be placed in the electronics housing, or to omit the pinger housing, in which case the pinger may be placed inside the electronics housing, or to omit the battery housing 406, in which case the additional battery pack 210' is placed in the pinger housing and a cap plate is attached to the strength plate to seal the electronics housing from the ambient water. In this regard, note that the strength plate has at least one opening which allows one or more wires from the battery pack 420 to connect to the electronics 540 in the electronics housing 402. Other elements of the compounded housing 202 may be omitted or replaced due to the high modularity of the compounded housing 202. For example, in one embodiment, it is possible to place the strength plate between the electronics housing and the pinger housing, and the strength plate has no opening for this case so that no water from the pinger housing passes through the strength plate into the electronics housing. The MEMS and associated board are placed then on the strength plate to face the electronics housing. However, irrespective of the chosen configuration, there is no fluid communication between the electronics housing 402 and the pinger housing 408 as the pinger housing is open to the sea water while the electronics housing needs to be sealed from the sea water.

Figure 9:
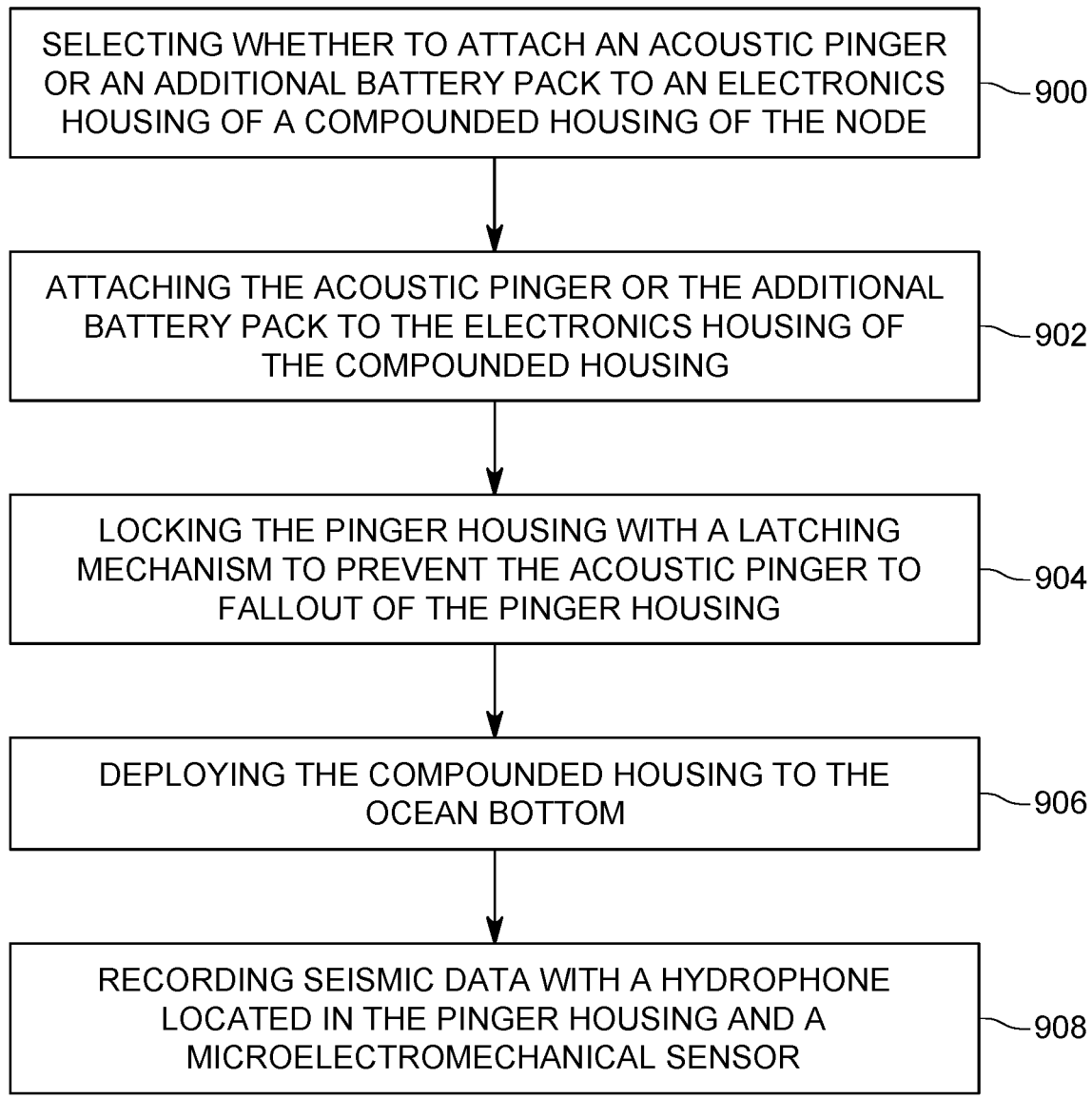
FIG. 9 is a method of collecting seismic data with an ocean bottom node.

A method for recording seismic data with the node 200 or 600 is now discussed with regard to FIG. 9. The method includes a step 900 of selecting whether to attach an acoustic pinger and its housing or an additional battery pack and its housing to a compounded housing of the node, a step 902 of attaching the acoustic pinger or the additional battery pack to the compounded housing, a step 904 of locking the pinger housing with a latching mechanism to prevent the acoustic pinger or the additional battery pack to fall out of the pinger housing, a step 906 of deploying the compounded housing to the ocean bottom, and a step 908 of recording seismic data with a hydrophone located in the pinger housing and a microelectromechanical sensor. In one application, the compounded housing includes a strength plate to which the microelectromechanical sensor is attached, the pinger housing is permanently open to ambient water, and the pinger housing is fluidly insulated from other elements of the compounded housing.

The disclosed embodiments provide an ocean bottom node that has a compounded housing, with one housing element allowing sea water and the other housing element not. An acoustic pinger is placed into the housing element open to the sea water and attached to the other housing element. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An ocean bottom node for collecting seismic data, the ocean bottom node comprising:
   a compounded housing including an electronics housing and a removable pinger housing;
   electronics located inside the electronics housing;
   an acoustic pinger, which is located in the removable pinger housing, and
   a battery pack configured to supply electrical power to the electronics,
   wherein the removable pinger housing is permanently open to an ambient water while the electronics housing is sealed from the ambient water,
   wherein the compounded housing is configured to have the pinger housing replaced with a battery housing for receiving an additional battery; and
   wherein the removable pinger housing is configured to directly attach next to the electronics housing, the electronics housing being outside the pinger housing.

2. The node of claim 1, wherein the compounded housing further includes:
   a strength plate made of a material so that the strength plate does not bend when deployed at high pressures on the ocean bottom; and
   a microelectromechanical sensor attached to the strength plate,
   wherein the microelectromechanical sensor is configured to detect low-frequency particle motions.

3. The node of claim 2, further comprising:
   a battery pack housing configured to house the battery pack,
   wherein the strength plate is sandwiched between the electronics housing and the battery pack housing.

4. The node of claim 2, wherein the strength plate is located perpendicular to a bottom of the compounded housing.

5. The node of claim 1, further comprising:
   a hydrophone electrically attached to the electronics of the electronics housing and located in the removable pinger housing.

6. The node of claim 1, further comprising:
   a latching mechanism attached to the compounded housing and configured to secure the acoustic pinger inside the removable pinger housing.

7. The node of claim 1, further comprising:
   a connecting mechanism removably attached to an outside of the electronics housing,
   wherein the connecting mechanism is configured to be attached to an external device.

8. The node of claim 7, wherein the connecting mechanism is removably attached with screws directly to the electronics housing.

9. The node of claim 1, further comprising:
   a protective cover provided over the compounded housing.

10. The node of claim 9, wherein the protective cover is configured so that at least a bottom portion of the compounded housing directly couples to the ocean bottom.

11. The node of claim 1, wherein the removable pinger housing is configured to selectively receive an acoustic pinger and is also configured to receive an additional battery pack instead of the acoustic pinger.

12. The node of claim 1, further comprising:
   an acoustic pinger placed inside the removable pinger housing so that an emitting head of the acoustic pinger protrudes outside the removable pinger housing and is surrounded by a latching mechanism.

13. An ocean bottom node for collecting seismic data, the ocean bottom node comprising:
   an electronics housing configured to hold electronics;
   a battery housing configured to house a battery pack;
   a pinger housing configured to house an acoustic pinger; and
   a strength plate configured to support a microelectromechanical sensor,
   wherein at least a side of the strength plate is directly exposed to an external ambient of the node, and
   wherein the pinger housing is configured to selectively receive an additional battery pack instead of the acoustic pinger, and to directly attach to the electronics housing.

14. The node of claim 13, wherein the battery housing, the strength plate, the electronics housing and the pinger housing are attached to each other in this order, with screws.

15. The node of claim 13, further comprising:
   a latching mechanism configured to hold the acoustic pinger inside the pinger housing,
   wherein the pinger housing is permanently open to an ambient water, and
   wherein the pinger housing is fluidly insulated from the electronics housing.

16. The node of claim 13, further comprising:
   a hydrophone electrically attached to the electronics of the electronics housing and physically located inside the pinger housing.

17. The node of claim 13, further comprising:
   a connecting mechanism removably attached with screws to the electronics housing.

* * * * *